United States Patent [19]

Kawamata et al.

[11] Patent Number: 4,857,279
[45] Date of Patent: Aug. 15, 1989

[54] APPARATUS FOR EXTRACTING FATS AND OILS

[75] Inventors: Yoshio Kawamata, Katsuta; Kiyoshi Iwai, Yokohama, both of Japan

[73] Assignee: Showa Sangyo Co., Ltd., Tokyo, Japan

[21] Appl. No.: 946,059

[22] Filed: Dec. 24, 1986

[30] Foreign Application Priority Data

Dec. 27, 1985 [JP] Japan .................. 60-293921

[51] Int. Cl.$^4$ ................................................. B01D 11/02
[52] U.S. Cl. ........................................ 422/268; 99/495;
99/516; 162/351; 162/354; 196/14.52; 202/117;
202/236; 210/400; 422/236; 422/264; 422/281;
422/292; 422/311
[58] Field of Search .............. 422/268, 264, 292, 311,
422/281, 236; 202/117, 236; 196/14.52; 99/495,
516; 162/351, 354; 210/400

[56] References Cited

U.S. PATENT DOCUMENTS

| 728,390 | 5/1903 | Graham | 210/400 |
|---|---|---|---|
| 1,155,605 | 10/1915 | Moore | 422/236 X |
| 2,684,288 | 7/1954 | De Smet | 422/268 |
| 2,733,136 | 1/1956 | Andrews | 422/268 |
| 2,907,640 | 10/1959 | König | 422/268 |
| 4,213,941 | 7/1980 | Boomer | 99/516 X |
| 4,308,034 | 12/1981 | Hoang | 202/117 X |
| 4,684,466 | 8/1987 | Terpstra | 99/495 X |

FOREIGN PATENT DOCUMENTS 0118022 6/1958 U.S.S.R. .......................... 422/268

Primary Examiner—Barry S. Richman
Assistant Examiner—Amalia L. Santiago
Attorney, Agent, or Firm—Oblon, Spivak, McClelland, Maier & Maier

[57] ABSTRACT

Edible fats and oils are extracted from oil-bearing materials by loading the raw materials onto an inlet end of a flat and fixed conveying surface having elongate slits therein. The materials are conveyed from the inlet end to the outlet end of the conveying surface by scrapers moved by endless chains. Oil extracting solvent is sprayed onto the material on the conveying surface, to produce miscella, which flows through the slits in the surface and into hoppers beneath the surface. The miscella is circulated back to additional sprayers located upstream of the solvent sprayers for spraying the miscella onto the upstream end of the conveying surface. The resulting concentrated miscella is collected in hoppers beneath the surface and delivered to a further use.

12 Claims, 3 Drawing Sheets

APPARATUS FOR EXTRACTING FATS AND OILS

BACKGROUND OF THE INVENTION

1. Field of the Invention

The present invention relates to a method and an apparatus for extracting fats and oils from animal or vegetable oil-bearing materials including soybean, rapeseed, sunflower, corn, and the like.

2. Background of the Related Art

Several types of edible oil extractors have been known such as the De Smet and the Lurgi extractors which are shown in FIGS. 5A and 5B, respectively.

The De Smet extractor shown in FIG. 5A has a structure in which the raw materials for extraction are loaded on and conveyed by a rotary metal-mesh conveyor 108, and solvent or miscella (i.e., a mixture of solvent and extracted oil) is sprayed over the raw materials in a manner to provide countercurrent flow extraction. The miscella receiving hoppers 115, into which the miscella flows down from the mesh conveyor, are located between the carrying and the returning stages of the rotary metal-mesh conveyor, and this inevitably increases the size of the extractor.

Further, the hoppers and the adjacent parts or elements are easily subject to corrosion, since they are positioned within the casing 101 of the extractor. Additionally, the metal-mesh of the conveyor is often stopped up or clogged by fine particles of the raw materials, and accordingly the returning stage of the conveyor must always be sufficiently washed by solvent during the operation. It is also necessary to clean the mesh conveyor at least once a year in a troublesome way.

The Lurgi extractor, which is shown in FIG. 5B, is rather complicated in structure and has and endless framed belt 208 which is supported by a two-stage endless sieve belt. The extraction is carried out in both the going and returning stages. In this case, the extractor is apt to be of a large size, since the height of the casing 201 should be larger than the total height of the upper and lower frames. The frames should have sufficient height to convey the necessary amount of raw materials held therein, and this is another reason the apparatus must be large-sized.

SUMMARY OF THE INVENTION

An object of the present invention is to provide a new method of extracting fats and oils which allows the extraction along a fixed surface.

Another object of the invention is to provide a new, compact and simple extractor for carrying out the new method of the invention.

The above, and other, objects are accomplished by a method of extracting edible fats and oils from a material, comprising the steps of loading the raw material onto an inlet end of a flat and fixed, i.e., stationary surface for conveying having elongate slits therein, using scrapers attached to endless chain belts to convey the raw material in the direction of elongation of the slits, from the inlet end to the outlet end of the conveying surface, and extracting oil from the raw material. The oil extracting step consists of the steps of spraying an oil extracting medium from a first spray means onto a plurality of inclined overflowing plates, to distribute the medium, flowing the medium from the overflowing plates onto the material on the flat surface, whereby oil is extracted to produce miscella, collecting in at least one first hopper placed beneath the flat surface, the miscella which has flowed through the slits, and spraying the collected miscella from second spray means placed nearer to the inlet end than are the first spray means.

The above objects are also accomplished by an apparatus including a flat and stationary surface for conveying having elongate slits therein, means for feeding the material onto an inlet end of the surface, means for discharging the material from an outlet end of the surface, means for advancing the material from the inlet to the outlet end, spray means positioned over the surface, whereby spray from the spray means extracts oil from the material on the surface to produce miscella, at least one first hopper positioned beneath the surface for collecting the miscella which has flowed through the slits, and means for feeding the miscella from the first hoppers to the spray means.

The oil-bearing raw material is loaded continuously on the inlet end of the plate through the inlet section of the apparatus and is conveyed thereon to the outlet end by the scrapers which are attached to the endless chains. Fresh solvent is sprayed over the raw material near the outlet end, after which the oil has been substantially extracted from the raw material by the solvent spray means. Solvent is permitted to flow out from the pipes and onto the inclined plates having a small overflowing leaf thereon, by which the flow of solvent is spread, and is sprayed continuously onto the raw material. The residual oil in the material is extracted and the miscella flows down into one of the first miscella receiving hoppers through the slits of the plate. The miscella also washes the returning stage of the endless chains while falling down into the first hoppers. The oil-extracted raw material is discharged through the outlet section of the apparatus and the miscella is then pumped up and fed to the miscella spray means placed upstream of the solvent spray means in order to spray the miscella onto the raw material at a zone upstream of the outlet end. This operation is carried out repeatedly, and thus the oil extraction is conducted countercurrently. The miscella obtained near the inlet end, which is the most concentrated, is then discharged from the apparatus for a following treatment such as distillation, oil refining, etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

A preferred embodiment of the present invention will be described with reference to the accompanying drawings.

Figure 4:
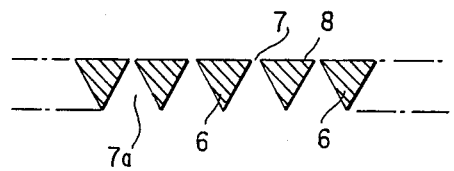
FIG. 4 is a sectional view of wedge wires of a flat conveying surface in the apparatus of FIG. 1 as seen along section IV—IV.
Figure 3:
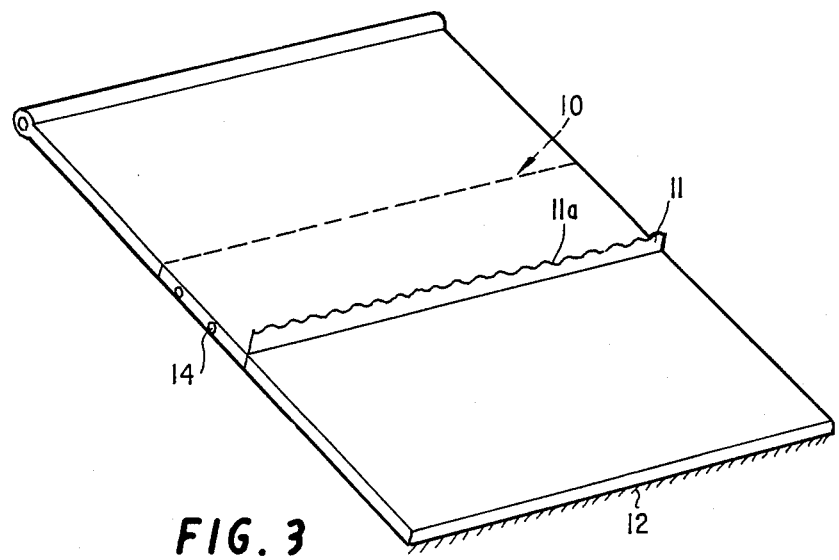
FIG. 3 is a perspective view of an overflowing plate used in the apparatus of FIG. 1.
Figure 5A:
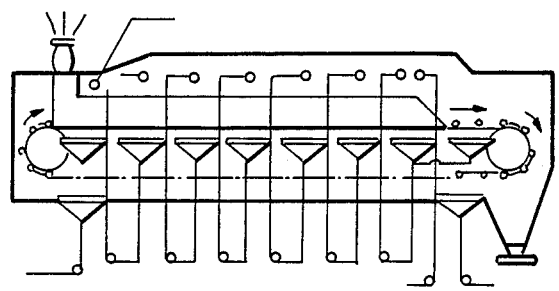
FIGS. 5A and 5B are illustrations of the conventional apparatus.
Figure 5B:
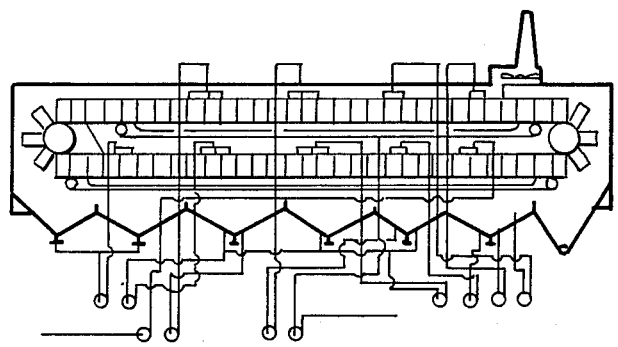

In FIGS. 1 through 4, endless conveyor chain belts 4 are engaged with a head pulley 2 and a tail pulley 3 in an elongated box-shaped housing 1. Scrapers 5 having a predetermined height "b" are attached to the chain belts 4 at predetermined intervals. A flat surface 8 which consists of wedge-shaped wires 6 and slits 7, the cross section of which is shown in FIG. 4, is placed between pulleys 2 and 3 so that the lower surface of the scrappers 5 at the carrying side 4a of the chain belt almost contacts the flat surface 8. The wedge wires are fixed at a position between pulleys 2 and 3, and are positioned so that the slits 7 run in the longitudinal direction of the flat surface 8. The scrapers 5 slide along the flat surface 8 due to the movement of the chain belts 4. Solvent (first) or miscella (second) supplying pipes 9 are placed in the upper portion of the housing 1, and inclined overflowing plates 10 are placed thereunder at predetermined intervals. The miscella pipes are positioned closer to the inlet end than are the solvent pipes. The plates 10 receive the flowing solvent or miscella from the pipes 9 and spread them via overflow leaves 11 attached thereon. The overflow leaves have saw-tooth edges 11a. The plates 10 also have some scraping nails 12 at the end of their reverse side. A distance "a" between the lower end of the plates 10 and the flat surface 8 is substantially the same as the thickness of the raw material, and is usually 3 to 10 times the height of the scrapers 5. In the illustrated embodiment, "a" is shown as 3 times the height of the scrapers 5. The thickness of the raw materials can be changed by a controller 13, i.e., a pivotable plate placed near the entrance 1a. The length of the plates 10 is adjustable by fixing means such as screws 14, according to the thickness of the raw material. Hoppers 15 are placed under the returning side 4b of the chain belt. The outlets 15a of some of the hoppers 15 are connected to the miscella pipes 9 through conduits 16 and pumping devices which are not shown in Figures. Miscella in the hoppers 15 beneath the solvent pipes (first hoppers) is always pumped up to the pipes 9 which are placed nearest to the inlet zone. Thus, the fresh raw material is always subject to extraction by the miscella, whereas the raw material from which oil has almost been extracted is treated by the fresh solvent. The second hoppers located beneath the miscella pipes are connected to a further use.

Figure 1:
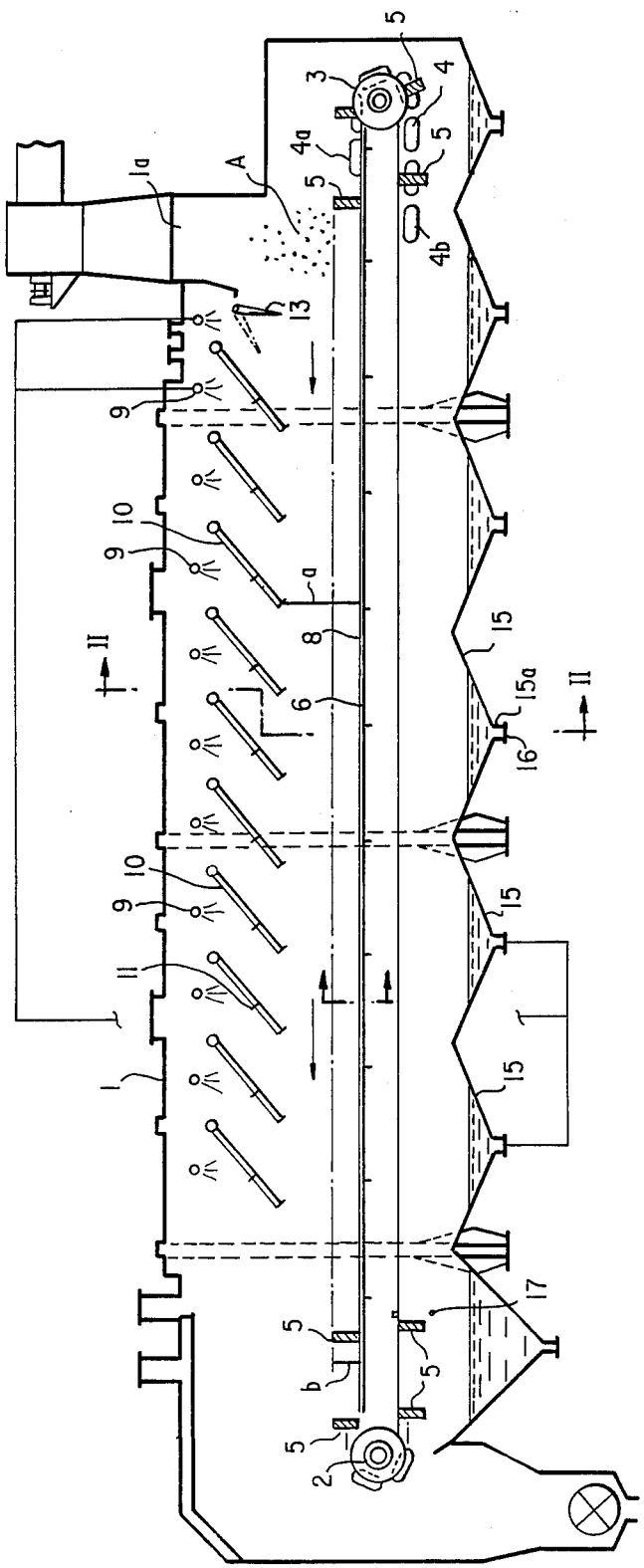
FIG. 1 is a side view of an apparatus according to the invention.
Figure 2:
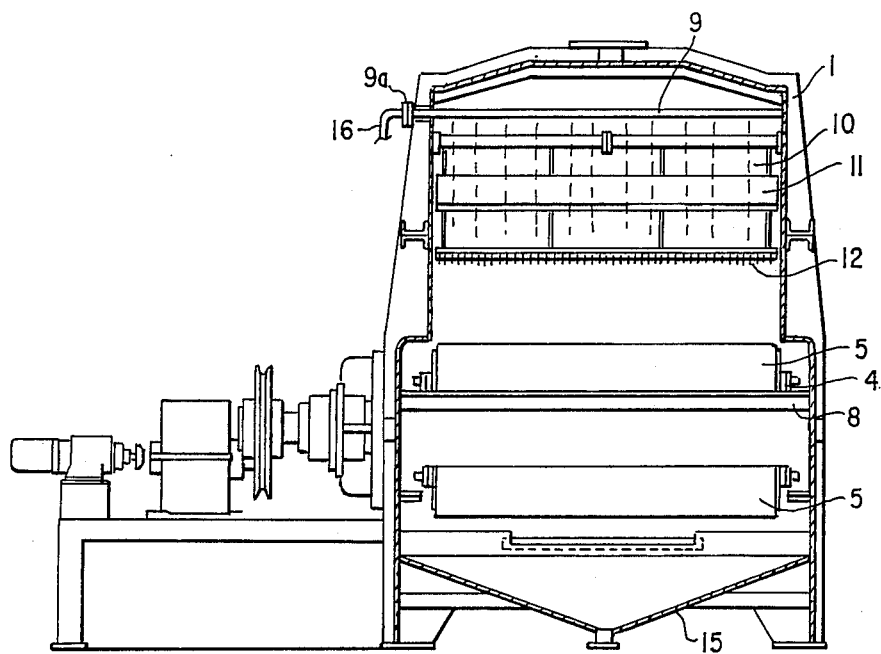
FIG. 2 is an illustration showing a sectional view of the apparatus of FIG. 1, as seen along section II—II.

By use of the apparatus illustrated in FIGS. 1 and 2, the raw material A is continuously supplied into the extractor through the opening 1a and loaded on the flat surface 8. The chain belts 4 are driven by the rotation of the pulleys 2 and 3, and the scrapers 5 convey the raw material along the flat surface 8 in the direction shown by the arrows in FIG. 1. The height "a" of the raw material is preliminarily adjusted by the controller 13. While the raw material is conveyed along the flat surface 8, oil extraction is countercurrently carried out. Fresh solvent such as hexane is fed through the leftmost pipes 9 onto the plate 10 and is sprayed over the raw material A near the outlet end, i.e., at the left end of FIG. 1. The miscella B collected in the leftmost hoppers 15 is then fed by a pump to the pipe 9 located nearer to the inlet end, and this operation is carried out repeatedly. The miscella B washes the returning side 4b of the chain belt as it flows down through the slits 7 of the flat surface 8. The chain belt returning side 4b is also washed by fresh solvent from a nozzle 17.

According to the present invention, the raw material is only conveyed on the flat top surface and need not go to the returning side. The returning side only needs a space for the height of the scrapers. Besides, the hoppers need not be placed between the carrying and the returning stages. Thus, the construction of the extractor of the present invention can be smaller and more compact.

The solvent or miscella spraying means is also one of the characteristics of the present invention. The inclined overflowing plate works very effectively to uniformly spread the solvent/miscella to the raw material, and thus, the oil extraction can be carried out efficiently.

The apparatus of this invention will be protected from corrosion since the chain belts and scrapers are always washed by the miscella or the fresh solvent. The flat surface is composed of the wedge wires and this makes easier the sliding movement of the scrapers. Also, the surface is always cleaned by the movement of the raw material itself. Fine particles originated from the raw materials are easily removed from the flat surface in the slits and do not cause the stopping up or the clogging of the mesh. The scrappers can convey raw materials ten times their height. This is one of the reasons why the apparatus can be made compact.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for extracting edible fats and oils from a material, comprising:
   a flat and stationary surface for supporting a conveyed material, said surface comprising a parallel array of wires defining elongate slits therebetween;
   means for feeding the material onto an inlet end of said surface;
   means for discharging the material from an outlet end of said surface;
   means for advancing the material from said inlet end to said outlet end without supporting the material, whereby the material rests on said flat and stationary surface between said inlet end and said outlet end;
   spray means comprising a plurality of fluid spray pipes arranged over said surface;
   an inclined overflowing plate positioned beneath each of said fluid spray pipes for receiving sprayed fluid therefrom;
   a saw-toothed overflow leaf attached to each of said overflowing plates for spreading the sprayed fluid, whereby the fluid can extract oil from the material on said surface to produce miscella;
   at least one first hopper positioned beneath said surface for collecting miscella which has flowed through said slits; and
   means for feeding the miscella from said at least one first hopper to said spray means.

2. The apparatus of claim 1 wherein said advancing means comprise:
   pulleys at opposite ends of said surface;

an endless chain mounted on said pulleys and extending above and below said surface; and scrapers mounted on said chain and comprising means for pushing the material on said surface, wherein said at least one first hopper is below any portion of said advancing means.

3. The apparatus of claim 1 including scraping nails mounted on a lower end of said overflowing plates.

4. The apparatus of claim 1, wherein said advancing means comprise scrapers and wherein a distance "a" between a lower end of each said overflowing plate and said surface is between 3 to 10 times a height of said scrapers.

5. The apparatus of claim 4 including means for adjusting a length of said overflowing plates, whereby a distance between a lowermost end of said overflowing plates and said surface may be adjusted.

6. The apparatus of claim 1 wherein said spray means includes first solvent spray means and second miscella spray means, said second miscella spray means being positioned closer to said inlet end than are said first solvent spray means, and wherein said means for feeding the miscella to said spray means comprises means for feeding the miscella only to said second spray means.

7. The apparatus of claim 6 including at least one second hopper positioned beneath said flat and stationary surface and beneath said second miscella spray means for collecting miscella which has flowed through said slits, and means for discharging the miscella from said second hopper.

8. An apparatus for extracting edible fats and oils from a material, comprising:

a flat and stationary surface for supporting a conveyed material, comprising a parallel array of wires defining elongate slits therebetween;

means for feeding the material onto an inlet end of said surface;

means for discharging the material from an outlet end of said surface;

means for advancing the material from said inlet end to said outlet end without supporting the material, whereby the material rests on said flat and stationary surface between said inlet end and said outlet end;

spray means positioned over said surface, whereby spray from said spray means extracts oil from a material on said surface to produce miscella;

at least one first hopper positioned beneath said surface for collecting miscella which has flowed through said slits; and means for feeding the miscella from said at least one first hopper to said spray means.

9. the apparatus of claim 8 wherein said wires comprise wedge-shaped wires having downwardly facing apexes.

10. The apparatus of claim 8 wherein said advancing means comprise:

pulleys at opposite ends of said surface;

an endless chain mounted on said pulleys and extending above and below said surface; and scrapers mounted on said chain and comprising means for pushing the material on said surface, wherein said at least one first hopper is below any portion of said advancing means.

11. The apparatus of claim 8 wherein said spray means comprise:

a plurality of fluid spray pipes arranged along said surface;

an inclined overflowing plate positioned beneath each of said fluid spray pipes for receiving sprayed fluid therefrom; and a saw-toothed overflow leaf attached to each of said overflowing plates for spreading the sprayed fluid.

12. The apparatus of claim 11 including at least one second hopper positioned beneath said surface and beneath said second miscella spray means for collecting miscella which has flowed through said slits, and means for discharging the miscella from said second hopper.

* * * * *

UNITED STATES PATENT AND TRADEMARK OFFICE
CERTIFICATE OF CORRECTION

PATENT NO. : 4,857,279

DATED : AUGUST 15, 1989

INVENTOR(S) : YOSHIO KAWAMATA and KIYOSHI IWAI

It is certified that error appears in the above-identified patent and that said Letters Patent is hereby corrected as shown below:

In column 4, line 27, delete "scrappers" and insert

--scrapers--

Signed and Sealed this

Seventh Day of August, 1990

Attest:

HARRY F. MANBECK, JR.

*Attesting Officer*  *Commissioner of Patents and Trademarks*